United States Patent [19]

Fraidlin et al.

[11] Patent Number: 5,838,552
[45] Date of Patent: Nov. 17, 1998

[54] ASYMMETRICAL POWER CONVERTER AND METHOD OF OPERATION THEREOF

[75] Inventors: Simon Fraidlin, Plano, Tex.; Valery I. Meleshin, Moscow, Russian Federation; Rais K. Miftakhutdinov, Moscow, Russian Federation; Sergey M. Korotkov, Moscow, Russian Federation

[73] Assignee: Lucent Technologies Inc, Murray Hill, N.J.

[21] Appl. No.: 829,921

[22] Filed: Apr. 1, 1997

[51] Int. Cl.⁶ .................................................. H02M 3/335
[52] U.S. Cl. ................................................. 363/16; 363/21
[58] Field of Search .................................. 363/15, 16, 20, 363/21, 95, 97, 71, 131

[56] References Cited

U.S. PATENT DOCUMENTS

| | | | |
|---|---|---|---|
| 3,938,938 | 2/1976 | Carlson | 431/78 |
| 4,188,660 | 2/1980 | Knoll | 363/49 |
| 4,188,661 | 2/1980 | Bower et al. | 363/49 |
| 5,126,931 | 6/1992 | Jitaru | 363/21 |
| 5,231,563 | 7/1993 | Jitaru | 363/98 |
| 5,268,830 | 12/1993 | Loftus, Jr. | 363/17 |
| 5,291,382 | 3/1994 | Cohen | 363/16 |
| 5,448,465 | 9/1995 | Yoshida et al. | 363/15 |
| 5,508,903 | 4/1996 | Alexndrov | 363/16 |
| 5,712,772 | 1/1998 | Telefus et al. | 363/21 |

OTHER PUBLICATIONS

Article entitled "Asymmetrical Duty Cycle Permits Zero Switching Loss in PWM Circuits with No Conduction Loss Penalty" by Paul Imbertson and Ned Mohan, IEEE Transactions on Industry Applications, vol. 29, No. 1, Jan./Feb. 1991, pp. 121–125.

Article entitled "Soft–Switching DC/DC Converter with PWM Control" by R. Oruganti, P.C. Heng, J. Tan K.G., Liew INTELEC '93 Record, 1993, vol. 1, pp. 31–349.

*Primary Examiner*—Adolf Berhane

[57] ABSTRACT

An asymmetrical power converter and a method of operation thereof. According to a first aspect of the present invention, the asymmetrical converter includes (1) first and second transformers having serially-coupled primary windings and differing turns ratios; (2) a first power switch coupled to a first end of the serially-coupled primary windings; (3) a second power switch coupled to a node between the serially-coupled primary windings and (4) a capacitive element coupled to a second end of the serially-coupled primary windings to maintain a volts-second balance thereacross during alternate switching cycles of the first and second power switches. According to a second aspect of the present invention, the asymmetrical converter includes (1) first and second transformers having serially-coupled primary windings and differing turns ratios; (2) a first power switch coupled to a first end of the serially-coupled primary windings; (3) a second power switch coupled to a second end of the serially-coupled primary windings and (4) a capacitive element coupled to a node between the serially-coupled primary windings to maintain a volts-second balance thereacross during alternate switching cycles of the first and second power switches.

30 Claims, 3 Drawing Sheets

ASYMMETRICAL POWER CONVERTER AND METHOD OF OPERATION THEREOF

CROSS-REFERENCE TO RELATED APPLICATION

The present application is related to U.S. patent application entitled "Reduced Voltage Stress Asymmetrical DC-to-DC Converter" by Fraidlin, et al., filed on Sep. 6, 1996, commonly assigned with the present invention and incorporated herein by reference as if reproduced herein in its entirety.

TECHNICAL FIELD OF THE INVENTION

The present invention is directed, in general, to power supplies and, more specifically, to asymmetrical power converters and a method of operation thereof.

BACKGROUND OF THE INVENTION

The development of high-efficiency power supplies in combination with a requirement of higher power density is a continuing goal in the field of power electronics. A switched-mode power converter or switched-mode converter is a frequently employed component of a power supply that converts an input voltage waveform into a specified output voltage waveform. There are several types of switched-mode converters including, for instance, an asymmetrical power converter.

A conventional asymmetrical DC/DC power converter ("asymmetrical converter") includes two (2) power-switching transistors coupled to a control circuit, at least one input/output isolation transformer, a rectifier and a low-pass filter. The asymmetrical converter generally operates as follows. The first and second power-switching transistors alternately conduct current in a complementary manner to convert an input DC voltage into an AC voltage to be impressed across the isolation transformer. The rectifier, then, rectifies the voltage and the low-pass filter smooths and filters the rectified voltage for delivery to a load being supplied by the half-bridge converter.

The control circuit monitors the output voltage of the asymmetrical converter and adjusts the duty cycle of the power-switching transistors to ultimately control the output voltage of the asymmetrical converter. This degree of control provides a mechanism to maintain the output voltage at a relatively consistent level despite relative fluctuations in the input voltage and the load at the output.

In conjunction with the requirement to increase the efficiency of the asymmetrical power converters, the losses associated with the components in the converter should be addressed. For instance, a conventional manner to reduce the voltage stress, and the accompanying losses associated therewith, on the power-switching transistors is by achieving zero-voltage switching ("ZVS") thereacross. Unfortunately, the losses associated with other components in the asymmetrical converter cannot not be dealt with by ZVS. For instance, the rectifier suffers significant voltage stresses leading to losses in the asymmetrical converter. In conjunction therewith, the rectifier realizes discernible reverse voltage stress as the input voltage range of the asymmetrical converter expands. An asymmetrical converter that can accommodate a wide range of input voltage is highly desirable.

Accordingly, what is needed in the art is an asymmetrical power converter with power circuitry that provides a well-regulated output, and, at the same time, distributes the stress within the converter to thereby achieve a highly efficient and cost effective converter.

SUMMARY OF THE INVENTION

To address the above-discussed deficiencies of the prior art, the present invention provides an asymmetrical power converter ("asymmetrical converter") and a method of operation thereof.

In a first aspect of the present invention, the asymmetrical converter includes (1) first and second transformers having serially-coupled primary windings and differing turns ratios; (2) a first power switch coupled to a first end of the serially-coupled primary windings; (3) a second power switch coupled to a node between the serially-coupled primary windings and (4) a capacitive element coupled to a second end of the serially-coupled primary windings to maintain a volts-second balance thereacross during alternate switching cycles of the first and second power switches.

The present invention provides the advantages of many separate converter topologies in a single asymmetrical converter. The asymmetrical converter can achieve low switching conduction losses by activating the first and second power switches during alternate switching cycles. Additionally, the asymmetrical converter employs multiple transformers having different turns ratios and a composite static transfer characteristic. The first and second transformer are selected to achieve a reduction in reverse voltage in a rectifier coupled to a secondary winding of each of the first and second transformers of the converter. With the reduction in the reverse voltage across the rectifier, the converter may employ a lower voltage rated and, therefore, more efficient rectifier. Additionally, the reduction in the dissipation of the rectifier and corresponding improved efficiency is directly translatable to an increase in the power density of the converter. Finally, a capacitive element is employed to maintain a volts-second balance across the serially-coupled primary windings of the first and second transformer during the alternate switching cycles of the first and second power switches.

In one alternative embodiment of the first aspect of the present invention, the asymmetrical converter includes another capacitive element, coupled in parallel with the primary winding of the first transformer, for enhancing a zero voltage switching ("ZVS") of the first and second power switches. Those skilled in the pertinent art should understand the advantage of employing energy storage devices, such as a capacitor, to enhance ZVS across switching devices in power supplies.

In one alternative embodiment of the first aspect of the present invention, the asymmetrical converter includes a controller for controlling the switching cycles of the first and second power switches. The controller activates the first power switch during a first interval for a duty cycle (D) and alternately activates the second power switch during a second interval for a duty cycle (1-D). The controller, therefore, monitors a characteristic of the converter and activates the switches in a complementary manner to suitably regulate an output voltage. The first power switch operates to store energy in an energy storage device (e.g., the primary winding of the first transformer) during the first interval. In the alternate cycle, the second power switch conducts while the first power switch is non-conducting. During this interval, the energy from the energy storage device is transferred to the load.

In one alternative embodiment of the first aspect of the present invention, the first and second power switches are each field effect transistors ("FETs"). Switches, such as FETs, are employed in switched-mode power converters (as described herein) because of inherent characteristics of the power converters, such as ZVS, that augment the overall operation of the power conversion devices. Those skilled in the pertinent art should understand that other switching devices are well within the scope of the present invention.

In one alternative embodiment of the first aspect of the present invention, the asymmetrical converter includes a rectifier, coupled to a secondary winding of each of the first and second isolation transformers, for providing a rectified output voltage to the load. Any rectification device, including, without limitation, at least one rectifying diode, is well within the broad scope of the present invention.

According to a second aspect of the present invention, the asymmetrical converter includes (1) first and second transformers having serially-coupled primary windings and differing turns ratios; (2) a first power switch coupled to a first end of the serially-coupled primary windings; (3) a second power switch coupled to a second end of the serially-coupled primary windings and (4) a capacitive element coupled to a node between the serially-coupled primary windings to maintain a volts-second balance thereacross during alternate switching cycles of the first and second power switches. The asymmetrical converter according to the second aspect of the present invention provides analogous advantages to those described above.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

DETAILED DESCRIPTION

Figure 1:
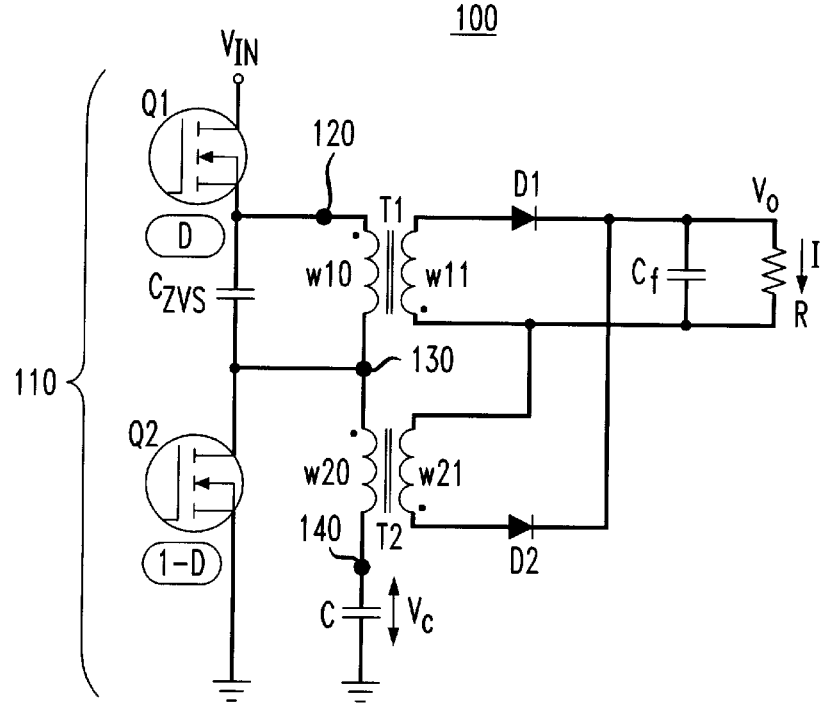
FIG. 1 illustrates a power supply incorporating one embodiment of an asymmetrical power converter constructed according to the principles of the present invention.

Referring initially to FIG. 1, illustrated is a power supply 100 incorporating one embodiment of an asymmetrical power converter ("asymmetrical converter) 110 constructed according to the principles of the present invention. The power supply 100 is coupled to a source of electrical power (not shown) and provides power to a load (designated by resistor R) coupled thereto. The asymmetrical converter 110 includes a first transformer T1 and a second transformer T2 having serially-coupled primary windings w10, w20, respectively, and differing turns ratios. The asymmetrical converter 110 also includes a first power switch Q1 coupled to a first end 120 of the serially-coupled primary windings w10, w20. The asymmetrical converter 110 further includes a second power switch Q2 coupled to a node 130 between the serially-coupled primary windings w10, w20. The asymmetrical converter 110 further includes a capacitive element C coupled to a second end 140 of the serially-coupled primary windings w10, w20 to maintain a volts-second balance thereacross during alternate switching cycles of the first and second power switches Q1, Q2. The asymmetrical converter 110 further includes another capacitive element $C_{ZVS}$, coupled in parallel with the primary winding w10 of the first transformer T1, for enhancing a zero voltage switching ("ZVS") of the first and second power switches Q1, Q2.

The asymmetrical converter 110 still further includes a controller (not shown) for controlling the switching cycles of the first and second power switches Q1, Q2. The controller activates the first power switch Q1 during a first interval for a duty cycle (D) and alternately activates the second power switch Q2 during a second interval for a duty cycle (1-D). The controller, therefore, monitors a characteristic of the converter 110 and activates the power switches Q1, Q2 in a complementary manner to suitably regulate an output voltage $V_o$. The first power switch Q1 operates to store energy in an energy storage device (e.g., the primary winding w10 of the first transformer T1) during the first interval. In the alternate cycle, the second power switch Q2 conducts while the first power switch Q1 is non-conducting. During this interval, the energy from the energy storage device is transferred to the load R.

The asymmetrical converter 110 still further includes a rectifier (comprising a pair of rectifier diodes D1, D2), coupled to a secondary winding w11, w21 of each of the first and second isolation transformers T1, T2, respectively, for providing a rectified output voltage $V_o$ to the load R. The asymmetrical converter 110 still further includes an output filter (designated by capacitor $C_f$), coupled to the secondary winding w11, w21 of each of the first and second transformers T1, T2, for providing a filtered output voltage $V_o$.

The operation of the asymmetrical converter 110 generally occurs as follows. During the first interval, for a duty cycle D, the first power switch Q1 is activated, the rectifier diode D2 is conducting and the first transformer T1 acts as an inductor. The asymmetrical converter 110 acts like a current-fed forward converter during this period. During the second interval, for a duty cycle 1-D, the second power switch Q2 is activated, the rectifier diode D2 opens and the first transformer T1 supplies the previously stored energy to the load R. During the transitional period between switching cycles, the asymmetrical converter 110 operates as follows. After the first power switch Q1 is de-activated, the leakage inductance of the first transformer T1 charges the parasitic capacitances of the first and second power switches Q1, Q2 such that the second power switch Q2 is activated with nearly zero volts thereacross thereby providing ZVS. Analogously, after the second power switch Q2 is de-activated, the leakage inductance of the second transformer T2 charges the parasitic capacitances of the first and second power switches Q1, Q2 such that the first power switch Q1 is activated with nearly zero volts thereacross thereby providing ZVS.

Figure 2:
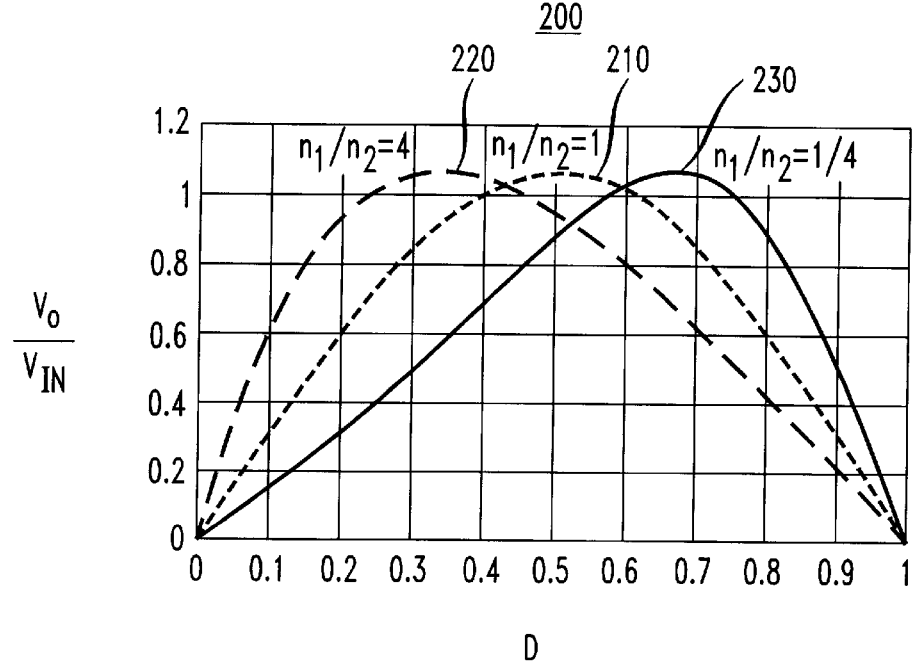
FIG. 2 illustrates a graphical representation of a plurality of voltage transfer ratios for the asymmetrical power converter of FIG. 1.

Turning now to FIG. 2, illustrated is a graphical representation 200 of a plurality of voltage transfer ratios for the asymmetrical converter 110 of FIG. 1. The graphical representation 200 demonstrates a transfer function (i.e., a ratio of the output voltage $V_o$ to the input voltage $V_{in}$) for a given duty cycle D for the first power switch Q1 and ratio of the turns ratio (i.e., $n_1/n_2$) for the first and second transformers T1, T2 of the asymmetrical converter 110. The transfer function for a ratio of $n_1/n_2$ equal to 1 (i.e., when the turns ratios of the first and second transformers T1, T2 are equal) is represented by waveform 210. The transfer function for a ratio of $n_1/n_2$ equal to 4 is represented by waveform 220. The transfer function for a ratio of $n_1/n_2$ equal to ¼ is represented by waveform 230.

The voltage transfer function for the asymmetrical converter 110 is generally represented by the following equation:

$$V_o/V_{in} = [n_1 \times D(1-D)]/[n_1/n_2 \times D + (1-D)^2] \qquad [1]$$

where:

$n_1 = w11/w10$; and $n_2 = w21/w20$.

The maximum duty cycle $D_{max}$ to provide a regulated output voltage $V_o$ is represented by the following equation.

$$D_{max} = 1/[1 + (n_1/n_2)^{1/2}] \qquad [2]$$

If the turns ratio $n_1$ for the first transformer T1 is less than the turns ratio $n_2$ for the second transformer T2, the maximum duty cycle $D_{max}$ for the first power switch Q1 exceeds 0.5. Thus, the duty cycle D should be maintained about 0.5 to achieve a well regulated output voltage $V_o$ and to minimize the voltage stress on the rectifier.

Figure 3:
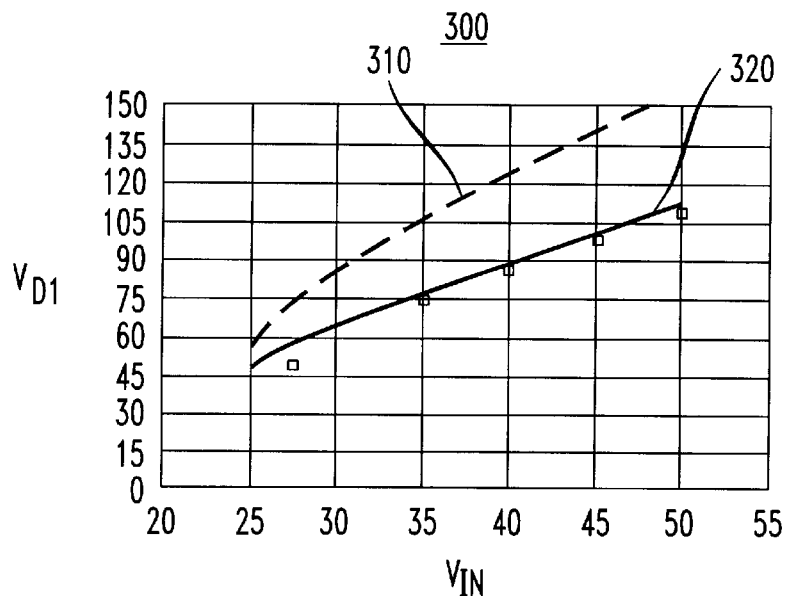
FIG. 3 illustrates a graphical representation of a voltage stress on the rectifier diode for the asymmetrical power converter of FIG. 1.

Turning now to FIG. 3, illustrated is a graphical representation 300 of a voltage stress $V_{D1}$ on the rectifier diode D1 for the asymmetrical converter 110 of FIG. 1. The graphical representation 300 demonstrates the voltage stress $V_{D1}$ across the rectifier diode D1 for a given input voltage $V_{in}$ and ratio of the turns ratio (i.e., $n_1/n_2$) for the first and second transformers T1, T2 of the asymmetrical converter 110. The voltage stress $V_{D1}$ for a ratio of $n_1/n_2$ equal to 1 (i.e., when the turns ratios of the first and second transformers T1, T2 are equal) is represented by waveform 310. The voltage stress $V_{D1}$ for a ratio of $n_1/n_2$ equal to one-half is represented by waveform 320.

The voltage stresses $VD_1$, $VD_2$ on the rectifier diodes D1, D2 are generally represented by:

$$V_{D1max} = V_o/D_{min}; \text{ and} \qquad [3]$$

$$V_{D1min} = V_o/(1-D_{max}) \qquad [4]$$

where:

$V_{D1max}$ is the maximum voltage stress across the rectifier diode D1;

$V_{D2max}$ is the maximum voltage stress across the rectifier diode D2;

$D_{min}$ is the minimum duty cycle for the first power switch Q1 to maintain a regulated output voltage $V_o$; and $D_{max}$ is the maximum duty cycle for the first power switch Q1 to maintain a regulated output voltage $V_o$.

By varying the turns ratios $n_1$, $n_2$ of the first and second transformers T1, T2, the minimum and maximum values $D_{min}$, $D_{max}$ of the duty cycle of the first power switch Q1 can be selected proximate to 0.5 thereby reducing the voltage stress of the rectifier.

The graphical representation 300, therefore, clearly demonstrates that employing transformers T1, T2 with varying turns ratios $n_1$, $n_2$, respectively, decreases the stress on the rectifier thereby enhancing the overall efficiency of the asymmetrical converter 110.

Figure 4:
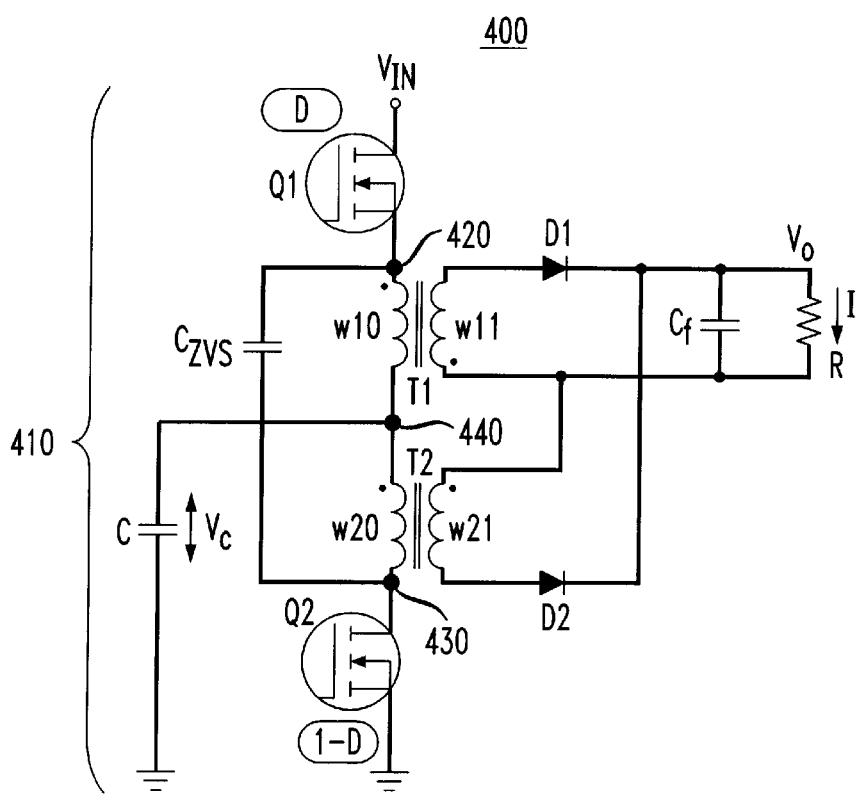
FIG. 4 illustrates a power supply incorporating an alternative embodiment of an asymmetrical power converter constructed according to the principles of the present invention.

Turning now to FIG. 4, illustrated is a power supply 400 incorporating an alternative embodiment of an asymmetrical power converter ("asymmetrical converter") 410 constructed according to the principles of the present invention. The power supply 400 is coupled to a source of electrical power (not shown) and provides power to a load (designated by resistor R) coupled thereto. The asymmetrical converter 410 includes a first transformer T1 and a second transformer T2 having serially-coupled primary windings w10, w20, respectively, and differing turns ratios. The asymmetrical converter 410 also includes a first power switch Q1 coupled to a first end 420 of the serially-coupled primary windings w10, w20. The asymmetrical converter 410 also includes a second power switch Q2 coupled to a second end 430 of the serially-coupled primary windings w10, w20. The asymmetrical converter 410 further includes a capacitive element C coupled to a node 440 between the serially-coupled primary windings w10, w20 to maintain a volts-second balance thereacross during alternate switching cycles of the first and second power switches Q1, Q2. The asymmetrical converter 410 further includes another capacitive element $C_{ZVS}$, coupled in parallel with the serially-coupled primary windings w10, w20, for enhancing a ZVS of the first and second power switches Q1, Q2.

Analogous to the asymmetrical converter 110 of FIG. 1, the asymmetrical converter 410 still further includes a controller (not shown) for controlling the switching cycles of the first and second power switches Q1, Q2. The controller activates the first power switch Q1 during a first interval for a duty cycle (D) and alternately activates the second power switch Q2 during a second interval for a duty cycle (1-D). The controller, therefore, monitors a characteristic of the converter 410 and activates the power switches Q1, Q2 in a complementary manner to suitably regulate an output voltage $V_o$. The first power switch Q1 operates to store energy in an energy storage device (e.g., the primary winding w10 of the first transformer T1) during the first interval. In the alternate cycle, the second power switch Q2 conducts while the first power switch Q1 is non-conducting. During this interval, the energy from the energy storage device is transferred to the load R.

The asymmetrical converter 410 still further includes a rectifier (comprising a pair of rectifier diodes D1, D2), coupled to a secondary winding w11, w21 of each of the first and second isolation transformers T1, T2, respectively, for providing a rectified output voltage $V_o$ to the load R. The asymmetrical converter 410 still further includes an output filter (designated by capacitor $C_f$), coupled to the secondary winding w11, w21 of each of the first and second transformers T1, T2, for providing a filtered output voltage $V_o$.

The asymmetrical converter 410 operates analogously to two (2) flyback converters coupled in series on the input side and in parallel on the output side. The duty cycles of the two (2) flyback converters are complementary with the first flyback converter having a duty cycle D and the second flyback converter having a duty cycle of 1-D. The voltage $V_c$ across the capacitor C varies with the duty cycle D to maintain a volts-second balance across the transformers T1, T2 during alternate switching cycles of the first and second power switches Q1, Q2. During the transitional period between switching cycles, the asymmetrical converter 410 operates as follows. After the first power switch Q1 is de-activated, the leakage inductance of the first transformer T1 charges the parasitic capacitances of the first and second power switches Q1, Q2 such that the second power switch Q2 is activated with nearly zero volts thereacross thereby providing ZVS. Analogously, after the second power switch Q2 is de-activated, the leakage inductance of the second transformer T2 charges the parasitic capacitances of the first and second power switches Q1, Q2 such that the first power switch Q1 is activated with nearly zero volts thereacross thereby providing ZVS.

Figure 5:
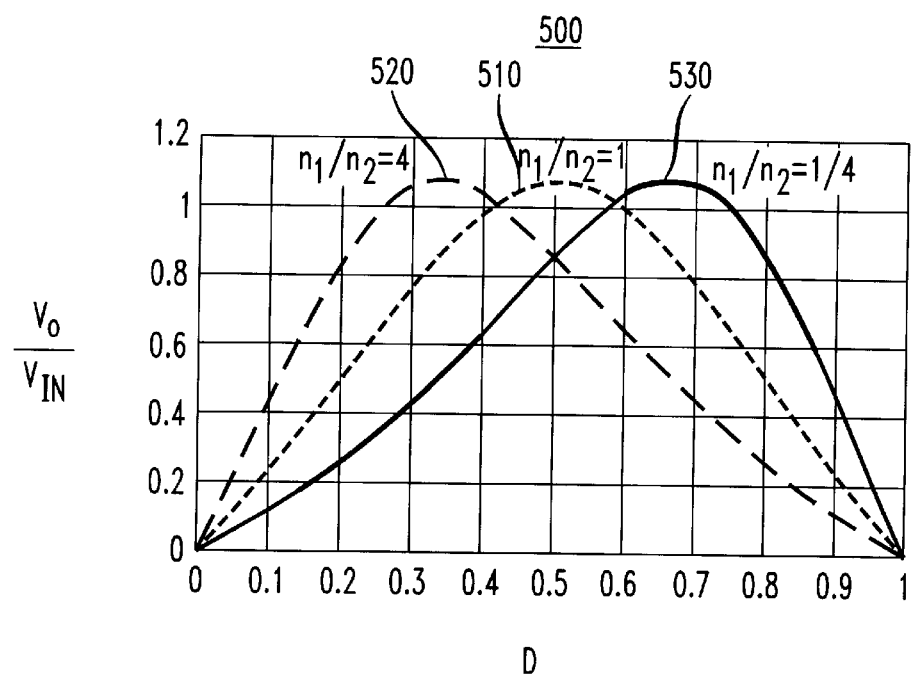
FIG. 5 illustrates a graphical representation of a plurality of voltage transfer ratios for the asymmetrical power converter of FIG. 4.

Turning now to FIG. 5, illustrated is a graphical representation 500 of a plurality of voltage transfer ratios for the asymmetrical power converter 410 of FIG. 4. The graphical representation 500 demonstrates a transfer function (i.e., a ratio of the output voltage $V_o$ to the input voltage $V_{in}$) for a given duty cycle D for the first power switch Q1 and ratio of the turns ratio (i.e., $n_1/n_2$) for the first and second transformers T1, T2 of the asymmetrical converter 410. The transfer function for a ratio of $n_1/n_2$ equal to 1 (i.e., when the turns ratios of the first and second transformers T1, T2 are equal) is represented by waveform 510. The transfer function for a ratio of $n_1/n_2$ equal to 4 is represented by waveform 520. The transfer function for a ratio of $n_1/n_2$ equal to ¼ is represented by waveform 530.

The voltage transfer function for the asymmetrical converter 410 is generally represented by the following equation:

$$V_o/V_{in} = [n_1 \times D(1-D)]/[n_1/n_2 \times D^2 + (1-D)^2] \quad [5]$$

where:

$n_1 = w11/w10$; and $n_2 = w21/w20$.

The maximum duty cycle $D_{max}$ to provide a regulated output voltage $V_o$ is represented by the following equation.

$$D_{max} = 1/[1 + (n_1/n_2)^{1/2}] \quad [6]$$

If the turns ratio $n_1$ for the first transformer T1 is less than the turns ratio $n_2$ for the second transformer T2, the maximum duty cycle $D_{max}$ for the first power switch Q1 exceeds 0.5. Thus, the duty cycle D should be maintained about 0.5 to achieve a well regulated output voltage $V_o$ and to minimize the voltage stress on the rectifier.

Figure 6:
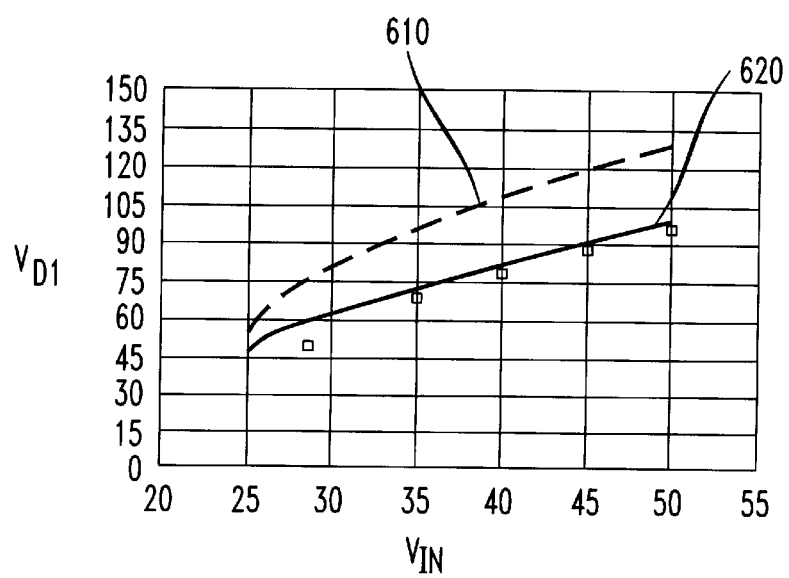
FIG. 6 illustrates a graphical representation of a voltage stress on the rectifier diode for the asymmetrical power converter of FIG. 4.

Turning now to FIG. 6, illustrated is a graphical representation 600 of a voltage stress $V_{D1}$ on the rectifier diode D1 for the asymmetrical converter 410 of FIG. 4. The graphical representation 600 demonstrates the voltage stress $V_{D1}$ across the rectifier diode D1 for a given input voltage $V_{in}$ and ratio of the turns ratio (i.e., $n_1/n_2$) for the first and second transformers T1, T2 of the asymmetrical converter 410. The voltage stress $V_{D1}$ for a ratio of $n_1/n_2$ equal to 1 (i.e., when the turns ratios of the first and second transformers T1, T2 are equal) is represented by waveform 610. The voltage stress $V_{D1}$ for a ratio of $n_1/n_2$ equal to one-half is represented by waveform 620.

The voltage stresses $V_{D1}$, $VD_2$ on the rectifier diodes D1, D2 are generally represented by:

$$V_{D1max} = V_o/D_{min}; \text{ and} \quad [7]$$

$$V_{D1min} = V_o/(1-D_{max}) \quad [8]$$

where:

$V_{D1max}$ is the maximum voltage stress across the rectifier diode D1;

$V_{D2max}$ is the maximum voltage stress across the rectifier diode D2;

$D_{min}$ is the minimum duty cycle for the first power switch Q1 to maintain a regulated output voltage $V_o$; and $D_{max}$ is the maximum duty cycle for the first power switch Q1 to maintain a regulated output voltage $V_o$.

By varying the turns ratios $n_1$, $n_2$ of the first and second transformers T1, T2, the minimum and maximum values $D_{min}$, $D_{max}$ of the duty cycle of the first power switch Q1 can be selected proximate to 0.5 thereby reducing the voltage stress of the rectifier.

The graphical representation 600, therefore, clearly demonstrates that employing transformers T1, T2 with varying turns ratios $n_1$, $n_2$, respectively, decreases the stress on the rectifier thereby enhancing the overall efficiency of the asymmetrical converter 410.

Although the present invention has been described in detail, those skilled in the art should understand that they can make various changes, substitutions and alterations herein without departing from the spirit and scope of the invention in its broadest form.

What is claimed is:

1. An asymmetrical converter, comprising:

first and second transformers having serially-coupled primary windings, parallel-coupled secondary windings and differing turns ratios;

a first power switch coupled to a first end of said serially-coupled primary windings;

a second power switch coupled to a node between said serially-coupled primary windings;

a first capacitive element coupled to a second end of said serially-coupled primary windings to maintain a volts-second balance thereacross during alternate switching cycles of said first and second power switches; and a rectifier, coupled to said parallel-coupled secondary windings, that delivers a rectified voltage to an output of said converter during both of said alternate switching cycles.

2. The converter as recited in claim 1 further comprising a second capacitive element, coupled in parallel with said primary winding of said first transformer, for enhancing a zero voltage switching (ZVS) of said first and second power switches.

3. The converter as recited in claim 1 further comprising a controller for controlling said switching cycles of said first and second power switches, said controller activating said first power switch during a first interval for a duty cycle (D) and alternately activating said second power switch during a second interval for a duty cycle (1-D).

4. The converter as recited in claim 1 wherein said first and second power switches are each field effect transistors (FETs).

5. The converter as recited in claim 1 wherein said rectifier is coupled to first and second ends, respectively, of said parallel-coupled secondary windings.

6. A method of operating an asymmetrical converter couplable of a source of electrical power and providing power to a load coupled thereto, comprising the steps of:

isolating said source of electrical power from said load with first and second transformers having serially-coupled primary windings, parallel-coupled secondary windings and differing turns ratios;

conducting current with a first power switch coupled to a first end of said serially-coupled primary windings;

alternately conducting current with a second power switch coupled to a node between said serially-coupled primary windings;

maintaining a volts-second balance across said serially-coupled primary windings during alternate switching cycles of said first and second power switches with a first capacitive element coupled to a second end of said serially-coupled primary windings; and delivering a rectified voltage to said load with a rectifier, coupled to said parallel-coupled secondary windings, during both of said alternate switching cycles.

7. The method as recited in claim 6 further comprising the step of enhancing a zero voltage switching (ZVS) of said first and second power switches with a second capacitive element coupled in parallel with said primary winding of said first transformer.

8. The method as recited in claim 6 further comprising the step of controlling said switching cycles of said first and second power switches with a controller, said controller activating said first power switch during a first interval for a duty cycle (D) and alternately activating said second power switch during a second interval for a duty cycle (1-D).

9. The method as recited in claim 6 wherein said first and second power switches are each field effect transistors (FETs).

10. The method as recited in claim 6 wherein said rectifier is coupled to first and second ends, respectively, of said parallel-coupled secondary windings.

11. A power supply, comprising:

an input couplable to a source of electrical power; and an asymmetrical converter, comprising:
first and second transformers having serially-coupled primary windings, parallel-coupled secondary windings and differing turns ratios;
a first power switch coupled to a first end of said serially-coupled primary windings;
a second power switch coupled to a node between said serially-coupled primary windings;
a first capacitive element coupled to a second end of said serially-coupled primary windings to maintain a volts-second balance thereacross during alternate switching cycles of said first and second power switches; and
a rectifier, coupled to said parallel-coupled secondary windings, that delivers a rectified voltage to an output of said converter during both of said alternate switching cycles.

12. The power supply as recited in claim 11 wherein said converter further comprises a second capacitive element, coupled in parallel with said primary winding of said first transformer, for enhancing a zero voltage switching (ZVS) of said first and second power switches.

13. The power supply as recited in claim 11 wherein said converter further comprises a controller for controlling said switching cycles of said first and second power switches, said controller activating said first power switch during a first interval for a duty cycle (D) and alternately activating said second power switch during a second interval for a duty cycle (1-D).

14. The power supply as recited in claim 11 wherein said converter further comprises an output filter, coupled to a secondary winding of each of said first and second transformers, for providing a filtered output voltage.

15. The power supply as recited in claim 1 wherein said rectifier is coupled to first and second ends, respectively, of said parallel-coupled secondary windings.

16. An asymmetrical converter, comprising:
first and second transformers having serially-coupled primary windings, parallel-coupled secondary windings and differing turns ratios;
a first power switch coupled to a first end of said serially-coupled primary windings;
a second power switch coupled to a second end of said serially-coupled primary windings;
a first capacitive element coupled to a node between said serially-coupled primary windings to maintain a volts-second balance thereacross during alternate switching cycles of said first and second power switches; and
a rectifier, coupled to said parallel-coupled secondary windings, that delivers a rectified voltage to an output of said converter during both of said alternate switching cycles.

17. The converter as recited in claim 16 further comprising a second capacitive element, coupled in parallel with said serially-coupled primary windings, for enhancing a zero voltage switching (ZVS) of said first and second power switches.

18. The converter as recited in claim 16 further comprising a controller for controlling said switching cycles of said first and second power switches, said controller activating said first power switch during a first interval for a duty cycle (D) and alternately activating said second power switch during a second interval for a duty cycle (1-D).

19. The converter as recited in claim 16 wherein said first and second power switches are each field effect transistors (FETs).

20. The converter as recited in claim 16 wherein said rectifier is coupled to first and second ends, respectively, of said parallel-coupled secondary windings.

21. A method of operating an asymmetrical converter couplable of a source of electrical power and providing power to a load coupled thereto, comprising the steps of:

isolating said source of electrical power from said load with first and second transformers having serially-coupled primary windings, parallel-coupled secondary windings and differing turns ratios;

conducting current with a first power switch coupled to a first end of said serially-coupled primary windings;

alternately conducting current with a second power switch coupled to a second end of said serially-coupled primary windings;

maintaining a volts-second balance across said serially-coupled primary windings during alternate switching cycles of said first and second power switches with a first capacitive element coupled to a node between said serially-coupled primary windings; and delivering a rectified voltage to said load with a rectifier, coupled to said parallel-coupled secondary windings, during both of said alternate switching cycles.

22. The method as recited in claim 21 further comprising the step of enhancing a zero voltage switching (ZVS) of said first and second power switches with a second capacitive element coupled in parallel with said serially-coupled primary windings.

23. The method as recited in claim 21 further comprising the step of controlling said switching cycles of said first and second power switches with a controller, said controller activating said first power switch during a first interval for a duty cycle (D) and alternately activating said second power switch during a second interval for a duty cycle (1-D).

24. The method as recited in claim 21 wherein said first and second power switches are each field effect transistors (FETs).

25. The method as recited in claim 21 wherein said rectifier is coupled to first and second ends, respectively, of said parallel-coupled secondary windings.

26. A power supply, comprising:
an input couplable to a source of electrical power; and
an asymmetrical converter, comprising:
  first and second transformers having serially-coupled primary windings, parallel-coupled secondary windings and differing turns ratios;
  a first power switch coupled to a first end of said serially-coupled primary windings;
  a second power switch coupled to a second end of said serially-coupled primary windings;
  a first capacitive element coupled to a node between said serially-coupled primary windings to maintain a volts-second balance thereacross during alternate switching cycles of said first and second power switches; and
  a rectifier, coupled to said parallel-coupled secondary windings, that delivers a rectified voltage to an output of said converter during both of said alternate switching cycles.

27. The power supply as recited in claim 26 wherein said converter further comprises a second capacitive element, coupled in parallel with said serially-coupled primary windings, for enhancing a zero voltage switching (ZVS) of said first and second power switches.

28. The power supply as recited in claim 26 wherein said converter further comprises a controller for controlling said switching cycles of said first and second power switches, said controller activating said first power switch during a first interval for a duty cycle (D) and alternately activating said second power switch during a second interval for a duty cycle (1-D).

29. The power supply as recited in claim 26 wherein said converter further comprises an output filter, coupled to a secondary winding of each of said first and second transformers, for providing a filtered output voltage.

30. The converter as recited in claim 26 wherein said rectifier is coupled to first and second ends, respectively, of said parallel-coupled secondary windings.

* * * * *